(12) United States Patent
Hijikata

(10) Patent No.: US 10,435,080 B2
(45) Date of Patent: Oct. 8, 2019

(54) VEHICLE LOWER STRUCTURE

(71) Applicant: TOYOTA JIDOSHA KABUSHIKI KAISHA, Toyota-shi (JP)

(72) Inventor: Kunihiro Hijikata, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/887,279

(22) Filed: Feb. 2, 2018

(65) Prior Publication Data

US 2018/0215418 A1    Aug. 2, 2018

(30) Foreign Application Priority Data

Feb. 2, 2017   (JP) ................. 2017-017596

(51) Int. Cl.
*B62D 25/20* (2006.01)
*B62D 23/00* (2006.01)

(52) U.S. Cl.
CPC ............. *B62D 25/20* (2013.01); *B62D 23/00* (2013.01)

(58) Field of Classification Search
CPC ..... B62D 25/20; B62D 23/00; B62D 25/2072
USPC .................................................. 296/193.07
See application file for complete search history.

(56) References Cited

U.S. PATENT DOCUMENTS

| | | | | |
|---|---|---|---|---|
| 2,856,226 A * | 10/1958 | Purdy | .................... | B62D 21/06 280/793 |
| 6,893,064 B2 * | 5/2005 | Satou | .................... | B60R 19/18 293/132 |
| 7,540,343 B2 * | 6/2009 | Nakashima | .............. | B60K 1/00 180/65.1 |
| 8,851,559 B2 * | 10/2014 | Fukushi | ................. | B62D 21/11 296/180.1 |
| 8,899,663 B2 * | 12/2014 | Hihara | ................... | B62D 25/20 296/187.12 |
| 9,981,701 B2 * | 5/2018 | Yonezawa | ............. | B62D 25/20 |
| 2011/0163570 A1 * | 7/2011 | Takeuchi | .............. | B62D 35/02 296/181.5 |
| 2013/0320713 A1 * | 12/2013 | Iwamoto | ................. | B60N 2/06 296/193.07 |
| 2016/0339970 A1 * | 11/2016 | Shibutake | ........... | B62D 35/005 |
| 2018/0093562 A1 * | 4/2018 | Murata | ................. | F01N 3/2046 |
| 2018/0201328 A1 * | 7/2018 | Hijikata | ............ | B62D 25/2072 |

FOREIGN PATENT DOCUMENTS

| | | |
|---|---|---|
| JP | 61-54977 U | 4/1986 |
| JP | 2009-40338 | 2/2009 |
| JP | 2009-184519 | 8/2009 |
| JP | 2013-112224 | 6/2013 |

* cited by examiner

*Primary Examiner* — Pinel E Romain
(74) *Attorney, Agent, or Firm* — Oblon, McClelland, Maier & Neustadt, L.L.P.

(57) ABSTRACT

A vehicle lower structure includes: a floor panel disposed in a lower part of a vehicle; an undercover disposed lower than the floor panel; and a brace extending in a vehicle width direction between the floor panel and the undercover in a vehicle vertical direction. The brace is connected to the floor panel and the undercover. An undercover-side connecting portion of the brace that is connected to the undercover is located at a lower position than a floor-panel-side connecting portion of the brace that is connected to the floor panel.

4 Claims, 3 Drawing Sheets

VEHICLE LOWER STRUCTURE

INCORPORATION BY REFERENCE

The disclosure of Japanese Patent Application No. 2017-017596 filed on Feb. 2, 2017 including the specification, drawings and abstract is incorporated herein by reference in its entirety.

BACKGROUND

1. Technical Field

The present disclosure relates to a vehicle lower structure.

2. Description of Related Art

In a vehicle lower structure described in Japanese Patent Application Publication No. 2013-112224 (JP 2013-112224 A), an undercover is disposed at a lower position than a floor panel (under a floor) of a vehicle. A bumper cover composing a design surface of a front bumper is assembled to a front edge portion of this undercover. In the vehicle lower structure described in JP 2013-112224 A, the undercover is provided with a recessed portion that is recessed upward, and a through-hole is formed in a bottom wall portion (an upper part) of the recessed portion. A screw is inserted from below through this through-hole. With the screw inserted in this way, the undercover is assembled to the bumper cover.

SUMMARY

As the vehicle lower structure described in JP 2013-112224 A, in a structure in which a screw is inserted through a through-hole of a recessed portion in an undercover so as to fix the undercover to a different member, if the recessed portion of the undercover has an excessively great depth, it is likely to cause disturbance of air flow flowing at a lower position than the undercover. Consequently, it might be impossible to attain enhancement effect of aerodynamic characteristics by the undercover as expected.

A vehicle lower structure of an aspect of the present disclosure includes: a floor panel disposed in a lower part of a vehicle; an undercover disposed lower than the floor panel; and a brace extending in a vehicle width direction between the floor panel and the undercover in a vehicle vertical direction. The brace is connected to the floor panel and the undercover. An undercover-side connecting portion of the brace that is connected to the undercover is located at a lower position than a floor-panel-side connecting portion of the brace that is connected to the floor panel.

In the above configuration, in the brace, the undercover-side connecting portion is located lower than the floor-panel-side connecting portions. Hence, it is not always necessary to form the undercover with a recessed portion used for connection to the undercover-side connecting portion. In addition, even if the undercover is formed with the recessed portion, it is unnecessary to recess the recessed portion closely to the floor panel in the vehicle vertical direction, so that it is sufficient to provide a relatively shallow recessed portion. In this way, according to the above configuration, since the undercover is formed with no excessively deep recessed portion, air flow flowing at a lower position than the undercover is unlikely to be disturbed by the recessed portion; therefore, it is possible to reliably attain enhancement effect of aerodynamic characteristics by the undercover.

In the vehicle lower structure, the undercover may be composed by a first undercover, and a second undercover arranged adjacent to the first undercover in the vehicle width direction. The brace may include, as the undercover-side connecting portion, a first undercover-side connecting portion that is a portion connected to the first undercover, and a second undercover-side connecting portion that is a portion connected to the second undercover, and at least one of the first undercover-side connecting portion and the second undercover-side connecting portion may be located at a lower position than the floor-panel-side connecting portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
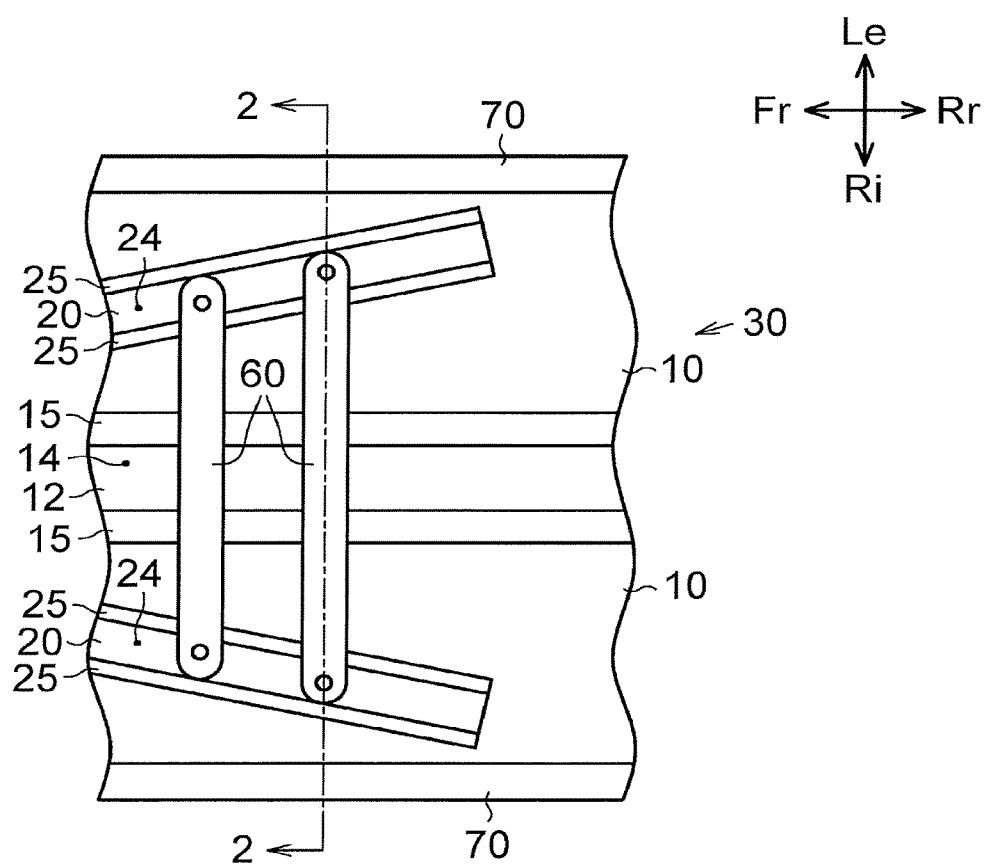
FIG. 1 is a lower view of a vehicle lower structure.
Figure 2:
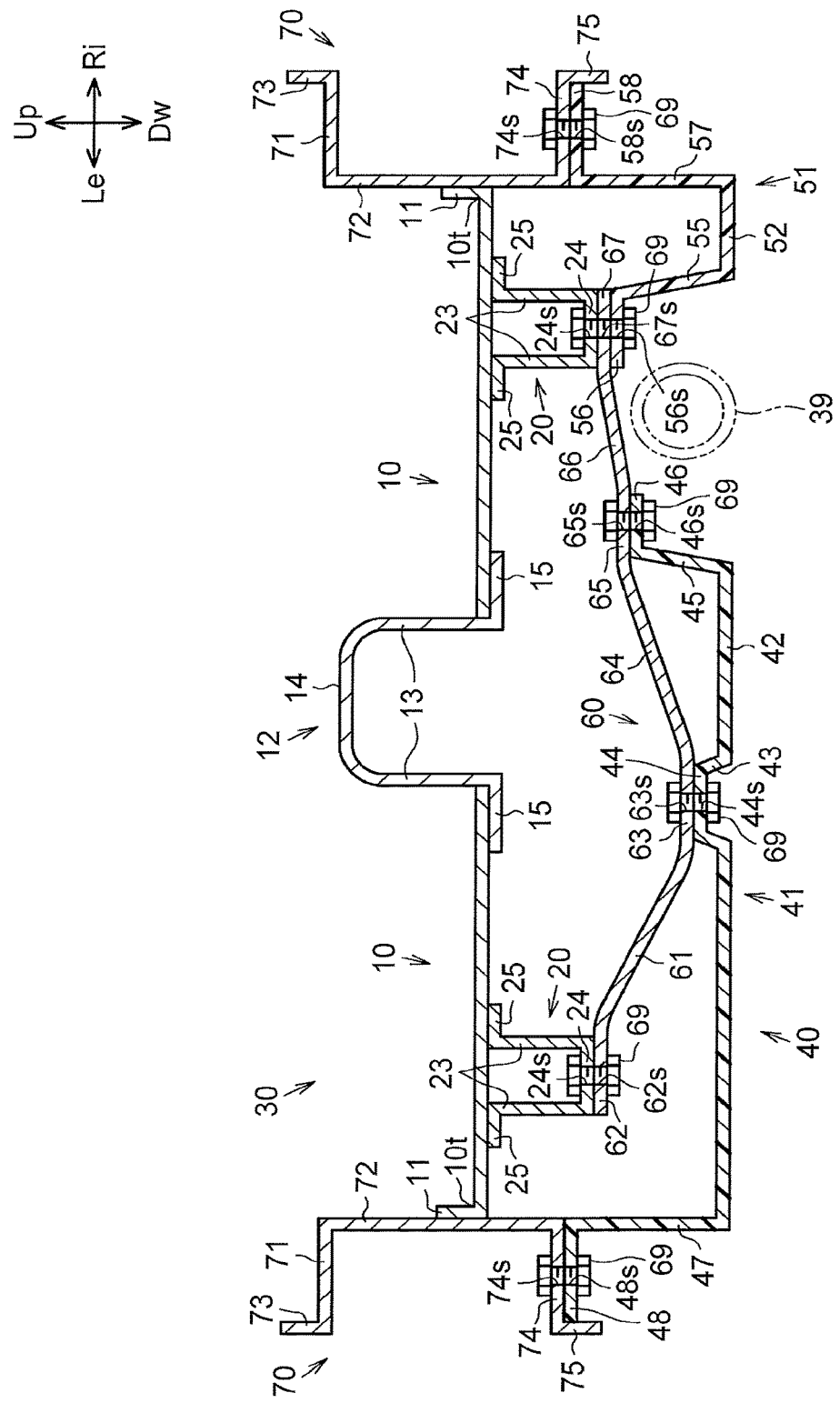
FIG. 2 is an end view taken along line 2-2 in FIG. 1.

Hereinafter, one embodiment of a vehicle lower structure will be described with reference to FIG. 1 and FIG. 2. In FIG. 1, an arrow Fr indicates a frontward direction in the vehicle longitudinal direction, and an arrow Rr indicates a rearward direction in the vehicle longitudinal direction, respectively. In FIG. 1 and FIG. 2, an arrow Le indicates a leftward direction in the vehicle width direction as facing the front in the vehicle longitudinal direction, and an arrow Ri indicates a rightward direction in the vehicle width direction as facing the front in the vehicle longitudinal direction, respectively. These directions are respectively referred to as a frontward direction, a rearward direction, a leftward direction, and a rightward direction, hereinafter. In FIG. 2, an arrow Up indicates a vehicle upward direction, and an arrow Dw indicates a vehicle downward direction, respectively.

As shown in FIG. 1 and FIG. 2, the vehicle lower structure includes a pair of floor pans 10 that are adjacently arranged in the vehicle width direction. Each of the floor pans 10 has a rectangular plate-like shape long in the vehicle longitudinal direction, and these pans are arranged with a distance therebetween in the vehicle width direction. A flange portion 11 extends upward from an outer edge portion 10t in the vehicle width direction of each floor pan 10. In the vehicle width direction, between the two floor pans 10, there is provided a floor tunnel 12 extending in the vehicle longitudinal direction.

As shown in FIG. 2, the floor tunnel 12 is formed by bending a flat plate member so as to have a hat-shaped cross section whose center in the vehicle width direction projects upward. Specifically, an upper wall portion 14 of the floor tunnel 12 extends in the vehicle longitudinal direction. Erect wall portions 13 extend downward from the respective edge portions on both sides in the vehicle width direction of the upper wall portion 14. Flange portions 15 extend outward in the vehicle width direction from lower edge portions of the respective erect wall portions 13. Of the floor tunnel 12, respective upper surfaces of the flange portions 15 are welded and fixed to respective inner lower surfaces in the vehicle width direction of the floor pans 10.

As shown in FIG. 1, the lower surfaces of the floor pans 10 are respectively provided with floor side members 20 extending generally in the vehicle longitudinal direction. Each floor side member 20 extends in such a manner as to be located more inward in the vehicle width direction as the floor side member 20 goes from the rear to the front. The floor side members 20 are provided to the right and left floor pans 10, respectively such that the right and left floor side members 20 come closer to each other as they go toward the front.

As shown in FIG. 2, each floor side member 20 is formed by bending a flat plate member so as to have a hat-shaped cross section whose center in the vehicle width direction projects downward. Specifically, in each floor side member 20, a lower wall portion 24 extends in the vehicle longitudinal direction. The lower wall portion 24 of each floor side member 20 is formed with through-holes 24s extending through this lower wall portion 24 in the thickness direction. Erect wall portions 23 extend upward from the respective edge portions on both sides in the vehicle width direction of the lower wall portion 24. Flange portions 25 extend outward from upper edge portions of the respective erect wall portions 23. An upper surface of each flange portion 25 of each floor side member 20 is welded and fixed to the lower surface of each floor pan 10. In the present embodiment, a floor panel 30 disposed in a lower part of the vehicle is configured to include the pair of floor pans 10, the floor tunnel 12, and the pair of floor side members 20.

A rocker inner 70 extending in the vehicle longitudinal direction is disposed more outward in the vehicle width direction than each floor pan 10. The rocker inner 70 is formed by bending a flat plate member so as to have a hat-shaped cross section. Specifically, in each rocker inner 70, an inner wall portion 72 extends in the vehicle vertical direction. An upper wall portion 71 extends outward in the vehicle width direction from an upper edge portion in the vehicle vertical direction of the inner wall portion 72. A flange portion 73 extends upward in the vehicle vertical direction from an outer edge portion in the vehicle width direction of the upper wall portion 71. A lower wall portion 74 extends outward in the vehicle width direction from a lower edge portion in the vehicle vertical direction of the inner wall portion 72. The lower wall portion 74 is provided with a through-hole 74s extending through this lower wall portion 74 in the thickness direction. A flange portion 75 extends downward in the vehicle vertical direction from an outer edge portion in the vehicle width direction of the lower wall portion 74. An inner side surface in the vehicle width direction of the inner wall portion 72 in each rocker inner 70 is welded and fixed to an outer side surface in the vehicle width direction of the flange portion 11 of each floor pan 10. A not-illustrated rocker outer having a hat-shaped cross section is fixed to an outer side in the vehicle width direction of each rocker inner 70, and the rocker inner 70 and the rocker outer compose a rocker in a substantially cylindrical shape.

A plate-like undercover 40 made of resin is disposed at a lower position than the floor pan 10. The undercover 40 is composed by a first undercover 41 located leftward in the vehicle width direction, and a second undercover 51 arranged on the right side in the vehicle width direction to be adjacent to the first undercover 41.

An end portion on the left side in the vehicle width direction of the first undercover 41 is configured as a flange portion 48 extending in the vehicle width direction. The flange portion 48 is formed with a through-hole 48s extending through this flange portion 48 in the thickness direction. This through-hole 48s of the flange portion 48 communicates with a through-hole 74s of the lower wall portion 74 of the rocker inner 70 on the left side in the vehicle width direction. A screw 69 is inserted through the through-hole 48s of the flange portion 48 and the through-hole 74s of the lower wall portion 74 of the rocker inner 70 on the left side in the vehicle width direction, from a lower position than the first undercover 41. With the screw 69 inserted in this way, the first undercover 41 is assembled to the rocker inner 70.

In the first undercover 41, from an edge portion on the right side in the vehicle width direction of the flange portion 48, the erect wall portion 47 extends downward. From a lower edge portion of the erect wall portion 47, a first cover body 42 extends rightward in the vehicle width direction. The first cover body 42 has a substantially flat plate-like shape orthogonal to the vehicle vertical direction, and faces a road surface where the vehicle travels. In a middle part in the vehicle width direction of the first cover body 42, a recessed portion 43 is so formed as to be recessed upward. The recessed portion 43 is located between the pair of floor side members 20 in the vehicle width direction. In this embodiment, the recessed portion 43 is disposed slightly leftward than the center in the vehicle width direction of the vehicle. A bottom wall portion 44 located at an upper position of the recessed portion 43 is located lower in the vehicle vertical direction than the lower wall portion 24 of each of the floor side members 20 in pair. The bottom wall portion 44 of the recessed portion 43 is formed with through-holes 44s extending through this bottom wall portion 44 in the thickness direction. The screw 69 is inserted through each through-hole 44s from below, and with this screw 69, the first undercover 41 is assembled to each of braces 60 described later.

An erect wall portion 45 extends upward from an edge portion on the right side in the vehicle width direction of the first cover body 42. A flange portion 46 extends rightward in the vehicle width direction from an upper edge portion of the erect wall portion 45. In the vehicle width direction, the flange portion 46 is disposed between the floor tunnel 12 and the floor side member 20 on the right side in the vehicle width direction. The flange portion 46 is disposed lower in the vehicle vertical direction than the respective lower wall portions 24 of the pair of floor side members 20. The flange portion 46 is formed with through-holes 46s extending through this flange portion 46 in the thickness direction. The screw 69 is inserted through each through-hole 46s from below, and with this screw 69, the first undercover 41 is assembled to each of the braces 60 described later.

An end portion on the right side in the vehicle width direction of the second undercover 51 is configured as a flange portion 58 extending in the vehicle width direction. The flange portion 58 is formed with a through-hole 58s extending through this flange portion 58 in the thickness direction. This through-hole 58s of the flange portion 58 communicates with the through-hole 74s of the lower wall portion 74 of the rocker inner 70 on the right side in the vehicle width direction. The screw 69 is inserted from a lower position than the second undercover 51 through the through-hole 58s of the flange portion 58 and each through-hole 74s of the lower wall portion 74 of the rocker inner 70 on the right side in the vehicle width direction. With this screw 69 inserted in this way, the second undercover 51 is assembled to the rocker inner 70.

In the second undercover 51, an erect wall portion 57 extends downward from an edge portion on the left side in the vehicle width direction of the flange portion 58. A second cover body 52 extends leftward in the vehicle width direction from a lower edge portion of the erect wall portion 57. The second cover body 52 has a substantially flat plate-like shape orthogonal to the vehicle vertical direction, and faces a road surface where the vehicle travels. An erect wall portion 55 extends upward from an edge portion on the left side in the vehicle width direction of the second undercover 51. A flange portion 56 extends leftward in the vehicle width direction from an upper edge portion of the erect wall portion 55. The flange portion 56 is formed with through-holes 56s extending through this flange portion 56 in the thickness direction.

In the second cover body 52, the through-hole 56s of the flange portion 56 communicates with the through-hole 24s of the lower wall portion 24 of the floor side member 20 on the right side in the vehicle width direction. The screw 69 is inserted from a lower position than the second undercover 51 through each through-hole 56s of the flange portion 56 and each through-hole 24s of the lower wall portion 24 of the floor side member 20 on the right side in the vehicle width direction. With this screw 69 inserted in this way, the second undercover 51 is assembled to the floor side member 20 on the right side in the vehicle width direction.

The flange portion 56 of the second undercover 51 is located more rightward in the vehicle width direction than the flange portion 46 of the first undercover 41. That is, the second undercover 51 and the first undercover 41 are disposed with a distance therebetween in the vehicle width direction. In a space sectioned and formed by the erect wall portion 45 and the flange portion 46 of the first undercover 41, and the erect wall portion 55 and the flange portion 56 of the second undercover 51, an exhaust pipe 39 extending from an internal combustion engine toward the rear is accommodated.

As shown in FIG. 1, the two metallic belt-like shaped braces 60 extending in the vehicle width direction are provided at lower positions than the floor panel 30. The two braces 60 are adjacently arranged in the vehicle longitudinal direction, and of these two braces 60, the brace 60 located frontward has a smaller dimension in the vehicle width direction than that of the brace 60 located rearward. Other than the length in the vehicle width direction thereof, the two braces 60 have the same configuration. Hereinafter, of the two braces 60, the brace 60 located rearward will be described.

As shown in FIG. 2, the brace 60 extends in the vehicle width direction between the floor panel 30, and the first undercover 41 and the second undercover 51 in the vehicle vertical direction in such a manner as to connect the right and left floor side members 20. A left end portion in the vehicle width direction of the brace 60 is configured as a first connecting portion 62 extending in the vehicle width direction. An upper surface of the first connecting portion 62 is in surface-contact with a lower surface of the lower wall portion 24 of the left floor side member 20. The first connecting portion 62 is formed with a through-hole 62s extending through this first connecting portion 62 in the thickness direction. This through-hole 62s communicates with the through-hole 24s of the lower wall portion 24 of the floor side member 20 on the left side in the vehicle width direction. The screw 69 is inserted from a lower position than the brace 60 through the through-hole 62s of the first connecting portion 62 of the brace 60 and the through-hole 24s of the lower wall portion 24 of the floor side member 20 on the left side in the vehicle width direction. With the screw 69 inserted in this way, the brace 60 is connected to the floor side member 20 on the left side in the vehicle width direction.

In each brace 60, a first extending portion 61 extends rightward and obliquely downward from an edge portion on the right side in the vehicle width direction of the first connecting portion 62. The first extending portion 61 extends from the lower wall portion 24 of the floor side member 20 on the left side in the vehicle width direction to the bottom wall portion 44 of the recessed portion 43 of the first undercover 41.

A second connecting portion 63 extends rightward in the vehicle width direction from an edge portion on the right side in the vehicle width direction of the first extending portion 61. A lower surface of the second connecting portion 63 is in surface-contact with an upper surface of the bottom wall portion 44 of the recessed portion 43 of the first undercover 41. The second connecting portion 63 is formed with a through-hole 63s extending through this second connecting portion 63 in the thickness direction. This through-hole 63s communicates with the through-hole 44s of the bottom wall portion 44 of the recessed portion 43 of the first undercover 41. The screw 69 is inserted from a lower position than the brace 60 through the through-hole 63s of the second connecting portion 63 of the brace 60 and the through-hole 44s of the bottom wall portion 44 of the recessed portion 43 in the first undercover 41. With the screw 69 inserted in this way, the brace 60 is connected to the first undercover 41. In each brace 60, the second connecting portion 63 that is a portion connected to the first undercover 41 is located at a lower position than the first connecting portion 62 that is a portion connected to the floor panel 30 (floor side member 20).

A second extending portion 64 extends rightward and obliquely upward from a right edge portion of the second connecting portion 63 of the brace 60. The second extending portion 64 extends from the bottom wall portion 44 of the recessed portion 43 of the first undercover 41 to the flange portion 46 of the first undercover 41.

A third connecting portion 65 extends rightward in the vehicle width direction from an edge portion on the right side in the vehicle width direction of the second extending portion 64. A lower surface of the third connecting portion 65 is in surface-contact with the upper surface of the flange portion 46 of the first undercover 41. The third connecting portion 65 is formed with a through-hole 65s extending through this third connecting portion 65 in the thickness direction. This through-hole 65s communicates with the through-hole 46s of the flange portion 46 of the first undercover 41. The screw 69 is inserted from a lower position than the brace 60 through the through-hole 65s of the third connecting portion 65 of the brace 60 and the through-hole 46s of the flange portion 46 in the first undercover 41. With the screw 69 inserted in this way, the brace 60 is connected to the first undercover 41. In each brace 60, the third connecting portion 65 that is a portion connected to the first undercover 41 is located at a lower position than the first connecting portion 62 that is a portion connected to the floor panel 30 (floor side member 20).

A third extending portion 66 extends rightward in the vehicle width direction from an edge portion on the right side in the vehicle width direction of the third connecting portion 65. The third extending portion 66 extends from the flange portion 46 of the first undercover 41 to the flange portion 56 of the second undercover 51.

A fourth connecting portion 67 extends rightward in the vehicle width direction from an edge portion on the right side in the vehicle width direction of the third extending portion 66. The fourth connecting portion 67 is held between the lower wall portion 24 of the floor side member 20 on the right side in the vehicle width direction and the flange portion 56 of the second undercover 51. An upper surface of the fourth connecting portion 67 is in surface-contact with the lower surface of the lower wall portion 24 of the floor side member 20 on the right side in the vehicle width direction, and a lower surface of the fourth connecting portion 67 is in surface-contact with an upper surface of the flange portion 56 of the second undercover 51. The fourth connecting portion 67 is formed with a through-hole 67s extending through this fourth connecting portion 67 in the thickness direction. This through-hole 67s communicates with the through-hole 56s of the flange portion 56 of the second undercover 51 and the through-hole 24s of the lower wall portion 24 of the floor side member 20 on the right side in the vehicle width direction. The screw 69 is inserted from a lower position than the brace 60 through the through-hole 67s of the fourth connecting portion 67 of the brace 60, the through-hole 56s of the flange portion 56 of the second undercover 51, and the through-hole 24s of the lower wall portion 24 of the floor side member 20 on the right side in the vehicle width direction. With the screw 69 inserted in this way, the brace 60 is connected to the second undercover 51 and the floor side member 20 on the right side in the vehicle width direction.

In this way, the braces 60 are connected to the floor side member 20 and the undercover 40 with the screws 69, to thereby assemble the undercover 40 to the floor panel 30 via the braces 60. In the present embodiment, the second connecting portion 63, the third connecting portion 65, and the fourth connecting portion 67 of each brace 60 that are respectively connected to the first undercover 41 are an example of an "undercover-side connecting portion". The second connecting portion 63 and the third connecting portion 65 of each brace 60 are equivalent to a "first undercover-side connecting portion", and the fourth connecting portion 67 of each brace 60 is an example of a "second undercover-side connecting portion". The first connecting portion 62 of each brace 60 connected to the floor panel 30 is an example of a "floor-panel-side connecting portion".

Figure 4:
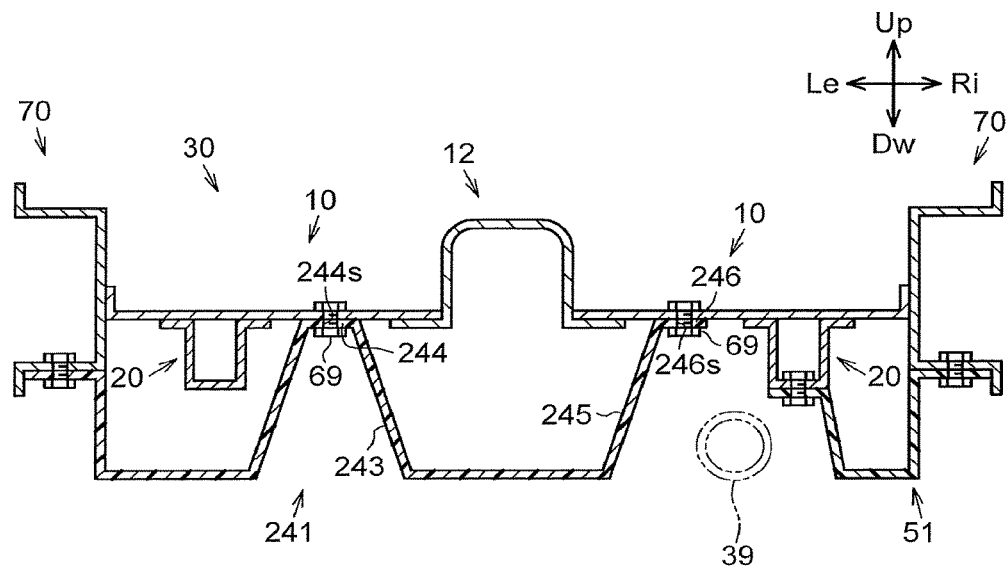
FIG. 4 is an end view of the vehicle lower structure provided with no brace.

Next, operation and effect of the above vehicle lower structure will be described. First, an example of the above vehicle lower structure provided with no braces 60 will be described. As shown in FIG. 4, in the vehicle lower structure provided with no braces 60, for example, the screw 69 is inserted through a through-hole 244s of a bottom wall portion 244 of a recessed portion 243 in a first undercover 241, to thereby fix the first undercover 241 to the floor pan 10. In this vehicle lower structure, the recessed portion 243 of the first undercover 241 is required to be recessed to the floor pan 10 in the vehicle vertical direction. Hence, a dimension in the vehicle vertical direction of the recessed portion 243 of the first undercover 241 becomes relatively longer (the recessed portion 243 becomes deeper).

When the first undercover 241 is fixed, it is required to put a tool into the recessed portion 243 of the first undercover 241 so as to screw the screw 69. Hence, an opening of the recessed portion 243 of the first undercover 241 is required to be enlarged to secure a sufficient space for putting and operating the tool inside of the recessed portion 243. In addition, when the first undercover 241 is produced by press-forming or the like, the recessed portion 243 must have a shape whose opening becomes larger as the recessed portion 243 goes downward from the bottom wall portion 244.

Hence, in the vehicle lower structure in the above example, the recessed portion 243 of the first undercover 241 also has a relatively larger dimension orthogonal to the vehicle vertical direction, in addition to a larger dimension in the vehicle vertical direction.

This point is the same in a flange portion 246 at a right end of the first undercover 241. That is, when the screw 69 is inserted through a through-hole 246s of the flange portion 246 of the first undercover 241 so as to fix the first undercover 241 to the floor pan 10, a recessed portion formed by the flange portion 246 and an erect wall portion 245 is required to be recessed to the floor pan 10 in the vehicle vertical direction. Consequently, the dimension in the vehicle vertical direction of the recessed portion formed by the flange portion 246 and the erect wall portion 245 becomes relatively longer.

Here, if the dimension of the recessed portion 243 of the first undercover 241 and the dimension of the recessed portion formed by the flange portion 246 and the erect wall portion 245 are excessively large, air flow flowing at a lower position than the first undercover 241 is likely to be disturbed. Consequently, it might be impossible to attain enhancement effect of aerodynamic characteristics by the first undercover 241 as expected.

To the contrary, in the above embodiment, of each brace 60, the second connecting portion 63 and the third connecting portion 65 that are connected to the first undercover 41 are located lower than the first connecting portion 62 of the brace 60 that is connected to the floor panel 30. Accordingly, it is unnecessary to recess the recessed portion 43 of the first undercover 41 used for connection to the second connecting portion 63 of each brace 60 closely to the floor panel 30 in the vehicle vertical direction, and thus it is sufficient to provide a relatively shallow recessed portion as the recessed portion 43. In addition, it is unnecessary to recess the flange portion 46 of the first undercover 41 used for connection to the third connecting portion 65 of each brace 60 closely to the floor panel 30 in the vehicle vertical direction, and thus it is sufficient to provide a relatively shallow recessed portion as the recessed portion formed by the erect wall portion 45 and the flange portion 46.

By setting the recessed portion 43 of the first undercover 41 to be relatively shallow, it becomes unnecessary to insert an entire tool used for screwing the screw 69 into the recessed portion 43. In this case, a lower space of the first cover body 42 excluding the recessed portion 43 can be used for handling the tool inserted in the recessed portion 43. Hence, with respect to the recessed portion 43 of the first undercover 41, not only the dimension thereof in the vehicle vertical direction but also dimensions thereof in directions orthogonal to the vehicle vertical direction can be set to be relatively small.

As described above, in the above vehicle lower structure, the dimension of the recessed portion 43 of the first undercover 41, and the dimension of the recessed portion formed by the flange portion 46 and the erect wall portion 45 are not excessively large. Hence, with the recessed portion 43 of the first undercover 41 and the recessed portion formed by the flange portion 46 and the erect wall portion 45, it becomes unlikely to disturb air flow flowing at a lower position than the first undercover 41, to thereby reliably attain enhancement effect of aerodynamic characteristics by the first undercover 41.

Meanwhile, in a vehicle including an internal combustion engine in a front part of the vehicle, an exhaust pipe 39 extends from the internal combustion engine to a rear end of the vehicle. In such a vehicle, it is necessary to secure an installation space for the exhaust pipe 39, and to prevent a part between the floor panel 30 and the undercover 40 from being filled with heat from the exhaust pipe 39; thus, it is not practical to cover the entire lower part of the floor panel 30 with the undercover 40.

In the above vehicle lower structure, the space between the first undercover 41 and the second undercover 51 in the vehicle width direction is secured as an installation space for the exhaust pipe 39. The part where the exhaust pipe 39 is disposed is not covered by the first undercover 41 and the second undercover 51. Accordingly, according to the vehicle lower structure of the above embodiment, it is possible to apply the configurations regarding the first undercover 41, the second undercover 51, and the braces 60 to an existing vehicle including an internal combustion engine, while minimizing design change in the exhaust pipe 39 and pertinent thereto.

Figure 3:
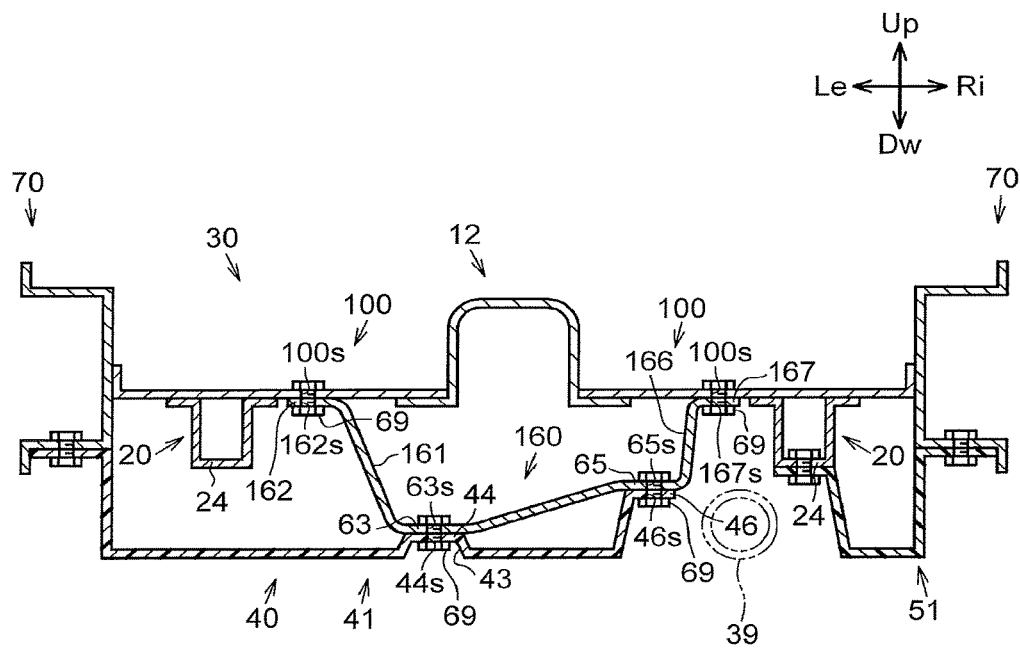
FIG. 3 is an end view of a vehicle lower structure in another embodiment.

The above embodiment may be changed to other embodiments as below. The braces 60 are connected to the floor side members 20 in the above embodiment, but may be connected to the floor pans 10. In the example shown in FIG. 3, an upper surface of a first connecting portion 162 of each brace 160 is in surface-contact with a lower surface of a floor pan 100 on the left side in the vehicle width direction. A first extending portion 161 extends from the floor pan 100 on the left side in the vehicle width direction to the bottom wall portion 44 of the recessed portion 43 of the first undercover 41. The floor pan 100 on the left side in the vehicle width direction is formed with a through-hole 100s extending through this floor pan 100 in the thickness direction. A through-hole 162s of the first connecting portion 162 of each brace 160 communicates with the through-hole 100s of the floor pan 100 on the left side of the vehicle width direction. The screw 69 is inserted from a lower position than the brace 160 through the through-hole 162s of the first connecting portion 162 of the brace 160 and the through-hole 100s of the floor pan 100 on the left side in the vehicle width direction. An upper surface of a fourth connecting portion 167 of each brace 160 is in surface-contact with a lower surface of the floor pan 100 on the right side in the vehicle width direction. A third extending portion 166 extends from the flange portion 46 of the first undercover 41 to the floor pan 100 on the right side in the vehicle width direction. The floor pan 100 on the right side in the vehicle width direction is formed with the through-hole 100s extending through this floor pan 100 in the thickness direction. A through-hole 167s of a fourth connecting portion 167 of each brace 160 communicates with the through-hole 100s of the floor pan 100 on the right side in the vehicle width direction. The screw 69 is inserted from a lower position than the brace 160 through the through-hole 167s of the fourth connecting portion 167 of the brace 160 and the through-hole 100s of the floor pan 100 on the right side in the vehicle width direction. In the brace 160 shown in FIG. 3, both the connecting manner of the first connecting portion 162 and the connecting manner of the fourth connecting portion 167 may be employed in the vehicle lower structure of the above embodiment, or either one of them may be employed in the vehicle lower structure of the above embodiment.

The right and left floor side members 20 may extend in such a manner as to be farther apart from each other as they go to the front. In the manner of the two braces 60 extending so as to connect the right and left floor side members 20, of the two braces 60, the brace 60 on the rear side has a shorter dimension in the vehicle width direction than that of the brace 60 on the front side.

In addition, the right and left floor side members 20 may extend in parallel with a constant distance therebetween from the front to the rear. In this manner, the two braces 60 have the same dimensions in the vehicle width direction.

In the above embodiment, the floor panel 30 is configured by fixing the pair of floor pans 10 and the floor tunnel 12 through welding, but a single plate material may be formed into the floor panel 30.

In the above embodiment, in each brace 60, the second connecting portion 63 and the third connecting portion 65 are both located lower than the first connecting portion 62, but the present disclosure is not limited to this. That is, only either one of the second connecting portion 63 and the third connecting portion 65 may be located lower than the first connecting portion 62.

Within a range in which the first undercover 41 and the braces 60 can be connected to each other, the formation position of the recessed portion 43 may be freely changed in the vehicle width direction of the first cover body 42. Within a range in which the first undercover 41 and the braces 60 can be connected to each other, the dimension in the vehicle width direction of the first undercover 41 may appropriately be changed. If the dimension in the vehicle width direction of the first undercover 41 is changed, in accordance with the position change of the edge portion on the right side in the vehicle width direction of the first undercover 41, the formation position in the vehicle width direction of the flange portion 46 is also changed. The dimension in the vehicle width direction of the second undercover 51 may also be changed so that the position of the edge portion on the left side in the vehicle width direction of the second undercover 51 is changed, in accordance with the position change of the edge portion on the right side in the vehicle width direction of the first undercover 41.

In the above embodiment, the first undercover 41 is connected to each brace 60 at two positions: the bottom wall portion 44 of the recessed portion 43 and the flange portion 46, but the present disclosure is not limited to this. For example, the first undercover 41 may be connected to each brace 60 at only one position in either of the bottom wall portion 44 of the recessed portion 43 and the flange portion 46, or may be connected at three or more positions in them. Taking the weight, the shape, and others of the first undercover 41 into account, it may be designed to secure a sufficient fixing strength relative to the floor panel 30. Note that when some of the fixing positions of the first undercover 41 relative to each brace 60 may be omitted or added, depending on this, the connecting portions and the through-holes of each brace 60 may be omitted or added.

The through-hole 44s may be formed in the first cover body 42 without forming the recessed portion 43 in the first cover body 42. Also in this manner, the screw 69 is inserted through the through-hole 44s of the first cover body 42 and the through-hole 63s of the second connecting portion 63 of each brace 60, to thereby fix the first undercover 41 to each brace 60.

A technique regarding the undercover 40 and the braces 60 of the above embodiment may be applied to an electric vehicle having no exhaust pipe 39, or the like. In the case of having no exhaust pipe 39, not the undercover 40 divided into the first undercover 41 and the second undercover 51, but a single integrated undercover connecting the right and left rocker inners 70 may be employed.

Of each brace 60, the portion connected to the lower wall portion 24 of the floor side member 20 on the right side in the vehicle width direction and the portion connected to the flange portion 56 of the second undercover 51 are located at different positions in the vehicle width direction. Of each brace 60 having such a manner, the portion connected to the flange portion 56 of the second undercover 51 is located lower than the portion connected to the lower wall portion 24 of the floor side member 20 on the right side in the vehicle width direction. According to this manner, it is sufficient to provide a relatively shallow recessed portion as the recessed portion formed by the erect wall portion 55 and the flange portion 56. Accordingly, it is possible to reliably attain enhancement effect of aerodynamic characteristics by the second undercover 51. In this manner, of each brace 60, the portion connected to the lower wall portion 24 of the floor side member 20 on the right side in the vehicle width direction is equivalent to the "floor-panel-side connecting portion", and the portion connected to the flange portion 56 of the second undercover 51 is equivalent to the "second-undercover-side connecting portion".

The undercover 40 may be formed by material other than resin, such as metal. The number of the braces 60 provided lower than the floor panel 30 may be one, or three or more. This may appropriately be changed taking the strength of the brace 60, the weight of the undercover 40, and others into account.

Each brace 60 may extend obliquely below the floor panel 30 so that the position thereof in the vehicle longitudinal direction becomes different as the brace 60 extends from the left to the right in the vehicle width direction.

Of the braces 60 provided at lower positions than the floor panel 30, if at least one of the braces 60 has the same shape as that of the brace 60 of the above embodiment and in the above variation, it is possible to exert the same effect as those in the above embodiment and the above variation.

The braces 60 may be formed by material other than metal, such as resin.

What is claimed is:

1. A vehicle lower structure comprising:
    a floor panel disposed in a lower part of a vehicle;
    a plate-like undercover disposed lower than the floor panel; and
    a brace extending in a vehicle width direction between the floor panel and the plate-like undercover in a vehicle vertical direction, the brace being connected to the floor panel and the plate-like undercover, wherein
    an undercover-side connecting portion of the brace that is connected to the plate-like undercover is located at a lower position than a floor-panel-side connecting portion of the brace that is connected to the floor panel.

2. The vehicle lower structure according to claim 1, wherein:
    the plate-like undercover includes a first undercover, and a second undercover arranged adjacent to the first undercover in the vehicle width direction;
    the brace includes, as the undercover-side connecting portion, a first undercover-side connecting portion that is a portion connected to the first undercover, and a second undercover-side connecting portion that is a portion connected to the second undercover; and
    at least one of the first undercover-side connecting portion and the second undercover-side connecting portion is located at a lower position than the floor-panel-side connecting portion.

3. The vehicle lower structure according to claim 1, wherein:
    the plate-like undercover is made of resin.

4. The vehicle lower structure according to claim 1, wherein:
    the plate-like undercover includes a recessed portion and a bottom wall portion located at an upper position of the recessed portion, and
    the undercover-side connecting portion of the brace is connected to an upper surface of the bottom wall portion of the recessed portion of the plate-like undercover.

* * * * *